United States Patent [19]

Hoff et al.

[11] 4,322,828

[45] Mar. 30, 1982

[54] SEISMIC AIRCRAFT MANEUVER CLASSIFIER

[75] Inventors: Dave Hoff, Brooklyn Park; Peter H. Vansloun, Hopkins, both of Minn.

[73] Assignee: Honeywell Inc., Minneapolis, Minn.

[21] Appl. No.: 223,627

[22] Filed: Jan. 9, 1981

[51] Int. Cl.³ .............................................. G01S 11/00
[52] U.S. Cl. ...................................... 367/118; 367/124; 367/136
[58] Field of Search ............... 367/135, 136, 117, 127, 367/118, 124

[56] References Cited

U.S. PATENT DOCUMENTS

| | | | |
|---|---|---|---|
| 3,343,167 | 9/1967 | Rademacher | 343/17.5 |
| 3,362,009 | 1/1968 | Midlock | 340/1 |
| 3,564,493 | 2/1971 | Hicklin | 340/15 |
| 3,705,516 | 12/1972 | Reis | 73/71.4 |
| 3,714,620 | 1/1973 | Biren et al. | 340/15 |
| 3,824,532 | 7/1974 | Vandierendonck | 367/136 |
| 3,842,663 | 10/1974 | Harting et al. | 73/67.2 |
| 3,913,085 | 10/1975 | Farstad | 367/136 |
| 3,971,249 | 7/1976 | Bachofer | 73/67 |
| 4,005,384 | 1/1977 | Pryor, Jr. et al. | 340/15 |
| 4,150,568 | 4/1979 | Berger et al. | 73/151 |

Primary Examiner—Richard A. Farley
Attorney, Agent, or Firm—Roger W. Jensen

[57] ABSTRACT

Apparatus for classifying the activity of an aircraft including the geophone proximate an airfield used by jet airplanes for generating a signal indicative of the existence of the jet aircraft. Amplifier means are provided for enhancing the signal. The signal is then passed through a low pass filter means for receiving the signal and passing only that portion having a frequency less than about 30 Hz. A high band pass filter also receives the signal and passes only that portion having a frequency ranging from about 90 Hz to about 120 Hz. Two demodulator means are provided which receive the low pass signal to provide a low pass envelope and receive the high band pass signal to produce a high band pass envelope. Threshold signal generating means are provided to receive the low pass envelope and the high band pass envelope, and generate a signal when either or both envelopes reach a predetermined threshold. Finally, comparator means are provided for comparing the time sequence of the signals generated by said threshold signal generating means to determine the activity of the jet aircraft.

In a preferred embodiment, a means for indicating the existence of a taxing aircraft is provided when the time the high band pass envelope exceeds its threshold is more than one second after the time the low band pass envelope exceeds its threshold, provided the low pass threshold, is still exceeded at that time. In addition, an indication signal of a take-off activity is provided when the time the low pass envelope exceeds its threshold is no more than one second before the time the high band pass envelope exceeds its threshold. The time the low pass exceeds its threshold can be after the high band pass exceeds its threshold. Finally, the device includes means for indicating a fly-over condition when the time of the closest point of approach (CPA) of the aircraft is less than the time the low pass envelope exceeds its threshold, provided the high band pass threshold has been exceeded.

8 Claims, 4 Drawing Figures

SEISMIC AIRCRAFT MANEUVER CLASSIFIER

BACKGROUND OF THE INVENTION

A maneuvering aircraft produces seismic activity by two means. First is by rolling on the ground or runway and generating a low frequency signal, which is coupled through the earth. The second is by acoustically coupling through the air and vibrating the ground around a sensor producing a higher frequency signal. Prior art methods have not recognized the seismic energy envelopes and accordingly have not developed a method for using them for any useful purpose.

U.S. Pat. No. 3,564,493 discloses an acoustic method wherein the acoustic energy is used to distinguish between ground vehicles and aircraft. U.S. Pat. No. 4,150,568 discloses a means for measuring vibrations of a portion of a drill string by means of a transducer which produces an electrical signal representative of the vibrations. A stepping filter is used. U.S. Pat. No. 3,971,249 discloses an acoustic method for looking for a change in the operating conditions of a bearing or similar device.

U.S. Pat. No. 3,705,516 discloses a two band amplitude discrimination which measures the operating condition of a machine by measuring the ratio of predetermined portions of the vibrational output. U.S. Pat. No. 3,714,620 discloses an acoustic device which detects slower fluctuation and lower amplitude variations on some vehicle signals to distinguish between aircraft signals and land motor vehicles. U.S. Pat. No. 3,824,532 is an intrusion detection unit which discloses a system which determines instrusions in an area by the pattern of seismic disturbances and produces a signal when the seismic disturbancer passes a predetermined level.

U.S. Pat. No. 3,842,663 provides a system for locating surface defects in machinery components by utilizing the resonant frequency of a transducer which discriminates against the background vibrations of the machinery. U.S. Pat. No. 4,005,384 is an acoustic system for the firing rate of internal combustion engines. U.S. Pat. No. 3,343,167 and Pat. No. 3,362,009 requires transmitting means which sent out signals processed the returned signal.

SUMMARY OF THE INVENTION

It has now been discovered that by use of the timing relationship between seismic energy envelopes developed by jet aircraft, a classification apparatus for determining the activity of a jet aircraft can be obtained. A basic activity which is categorized or classified is taxing, taking off, and flying over. Such a classification of jet aircraft activity has many uses, particularly in providing a means for alerting monitors at a remote location of activity which is not authorized. Once a particular activity has been identified, various steps can be taken depending upon the desires of those monitoring the activity.

The apparatus of the present invention which is useful for classifying the activity of a jet aircraft comprises the following equipment. First, a geophone is provided proximate an air-field used by jet aircrafts for generating a signal indicative of the existence of the jet aircraft. Two such geophones are the L-14 model manufactured by GEOSPACE, Inc. and the L-14 model manufactured by MARK Products. The geophone produces a signal indicative of the seismic disturbance over a wide range of frequencies. Amplifier means are provided for enhancing the signal.

A low pass filter means is provided for receiving the signal from the geophone and the amplifier and passing only that portion of the signal having a frequency less than about 30 Hz. This frequency corresponds to the rolling of the aircraft on the ground or runway and is coupled through the earth to the geophone. Also provided is a high band pass filter means for receiving the signal and passing only that portion having a frequency ranging from about 90 to about 120 Hz. This signal is caused by the acoustic coupling through the air and following vibration of the ground around the sensor such that the seismic activity of the ground around the sensor produces a high frequency signal.

Demodulator means are provided for receiving the low pass signal to provide a low pass envelope and for receiving the high band pass signal to provide a high band pass envelope. The envelopes are transmitted to threshold signal generating means for receiving the low pass envelope and the high pass envelope and generating a signal when an envelope reaches a predetermined threshold. Finally, comparator means are provided for comparing the time sequence of signals generated by the threshold signal generating means to determine the activity of the jet aircraft.

It has been discovered that the time of the envelope for the high band pass exceeding its threshold occurs much more than one second after the time of the low pass signal envelope reaching its threshold when a jet aircraft is taxing. The high threshold time signal occurs before or within 1 or less seconds after the time of the low pass signal exceeding its envelope and both occurs before the CPA when the jet aircraft is taking off: Finally, the time of the closest point of approach of the jet aircraft and the high frequency threshold time occur before the time the low pass signal envelope exceeds its threshold when the jet aircraft is flying over.

Preferred embodiment, the apparatus further includes approach timing means for generating a signal at the time the closest point of approach the jet aircraft occurs. The signal being sent to the comparator means so that the comparator means can compare the time sequence of the approach timing means and the threshold signal generating means so as to determine the activity of the jet aircraft. A device for determining the closest point of approach is disclosed and claimed in a U.S. patent application filed on Sept. 13, 1979, having Ser. No. 075,346 and title of ACOUSTIC SENSOR, now Pat. No. 4,279,027.

In another preferred embodiment, the device of the present invention includes indicating means for providing a signal indicating the passing of a taxing jet aircraft. The indicating means being actuated by a signal from the comparator means. The comparator means, in this embodiment, sends said signal to the indicating means when the time of the high band pass envelope exceeds its threshold more than one second after the time of the low band pass envelope exceeds its threshold.

In another embodiment, the apparatus includes indicating means for providing a signal indicating a take-off activity of a jet aircraft, with the means being activated by a signal from the comparator means.

A take-off is indicated when and if the low frequency envelope exceeds its threshold at any point in time from a time one second or less before the high frequency envelope exceeds its threshold up to the time of the closest point of approach. Take-off is indicated if low frequency envelope crosses its threshold during the shaded time period.

Finally, in another embodiment, indicator means are provided for providing a signal indicating a fly-over activity of a jet aircraft with the indicating means having activated by a signal from the comparator means. The comparator means is adapted to send the signal to the indicating means when the time of the closest point of approach is less than the time that said low pass envelope exceeds its threshold, provided the high frequency threshold has been exceeded.

BRIEF DESCRIPTION OF THE DRAWINGS

For a more complete understanding of the invention, reference is hereby made to the drawings, in which.

DESCRIPTION OF THE PREFERRED EMBODIMENT

Figure 1:
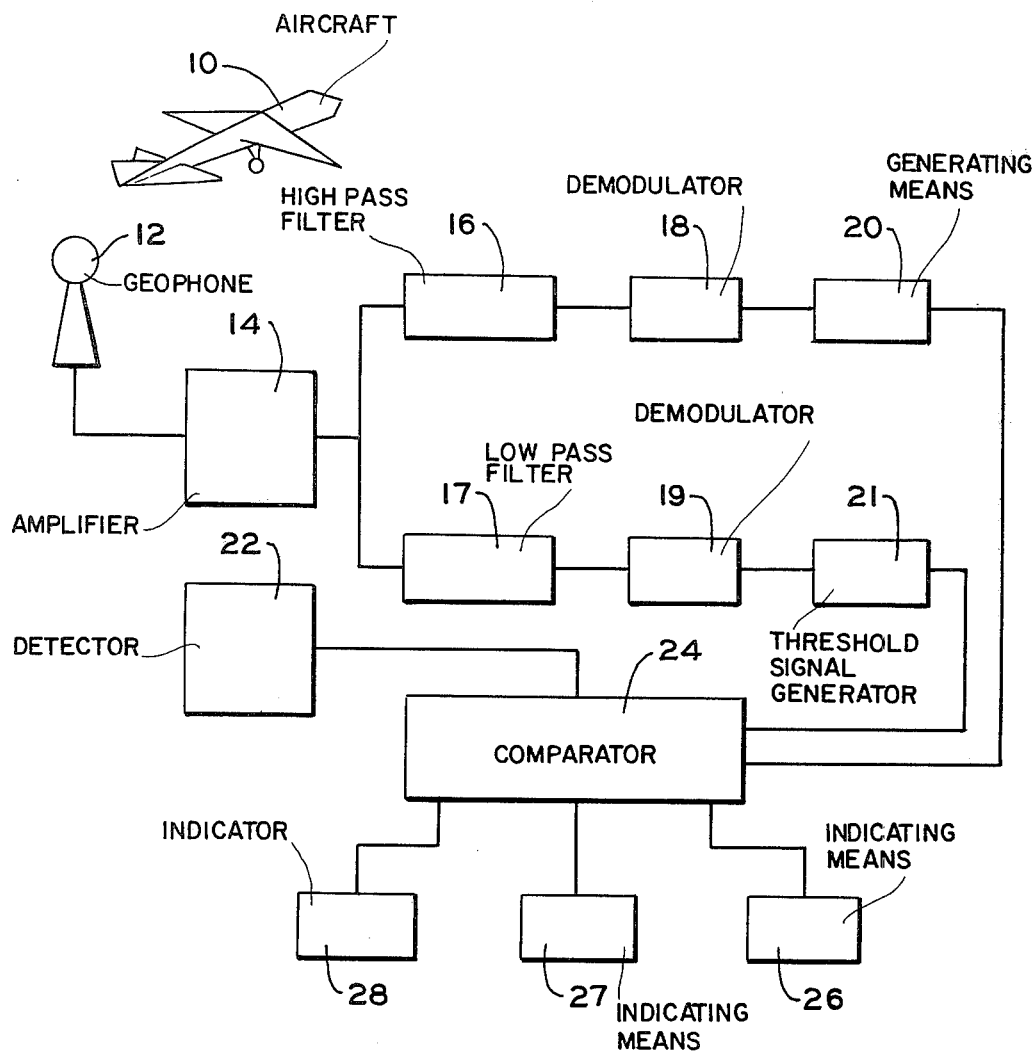
FIG. 1 is a schematic view showing the preferred embodiment of the present invention.

As shown in FIG. 1, a jet aircraft 10 is an activity, either taxing, taking off or flying over the airstrip. Geophone 12 is located in proximate position on the airfield used by the jet airplane to generate a signal indicating the existing of the jet aircraft. Geophone 12 is a seismic geophone thus previously described. The signal from the geophone 12 is passed to the amplifier 14 to provide a processing useful enhanced signal. High band pass filter 16 passes that portion of the signal which ranges between 90 Hz and 120 Hz. Similarly, low pass filter 17 passes the portion of the signal which is below about 30 Hz. Demodulator 18 receives the high band pass filter signal and demodulator 19 receives the low pass filter signal from filter 17. Demodulator 18 provides a low pass envelope to threshold signal generating means 20 which generates a signal when the envelope reaches a predetermined threshold. Similarly, threshold signal generator 21 generates a signal when the high band pass envelope reaches a predetermined threshold. Both of these signals are transmitted to comparator 24 to compare the time sequences of the signals generated by these threshold signal generating means to determine the activity of the jet aircraft. Closest point of approach detector 22, which operates according to the principles of the invention in previously identified application filed on Sept. 13, 1979, having Ser. No. 075,346 generates a signal at the time when the closest point of approach of the moving jet aircraft occurs.

The comparator 24 generates one of three signals depending upon the activity of the jet aircraft. If the jet aircraft is taxing in the vicinity of geophone 12, indicating means 26 provides a signal indicating the passing of a taxing jet aircraft upon a signal from the comparator means 24. The comparator sends such a signal to indicating means 26 when the time of the high band pass envelope exceeds its threshold more than one second after the time the low band envelope exceeds its threshold.

Similarly, indicating means 27 indicates a take-off activity of a jet aircraft when a signal is sent from the comparator 24. Comparator 24 sends such a signal when the time of the low pass envelope exceeds its threshold to obtain a threshold signal generated signal from generator 21 between the time from less than one second before the time the high band pass envelope exceeds its threshold as generated by threshold signal generator 20 up to CPA. Finally, flyover indicator 28 is activated upon a signal from the comparator indicating a fly-over activity of a jet aircraft. This indicator 28 is activated by a signal from the comparator indicating that the time of closest point of approach from detector 22 is sooner than the time that th low pass envelope exceeds its threshold as generated by threshold signal generator 21.

To demonstrate the efficiencies of the present invention, the device shown in FIG. 1 was placed at an airstrip and a jet aircraft was caused to perform various activities.

Figure 2:
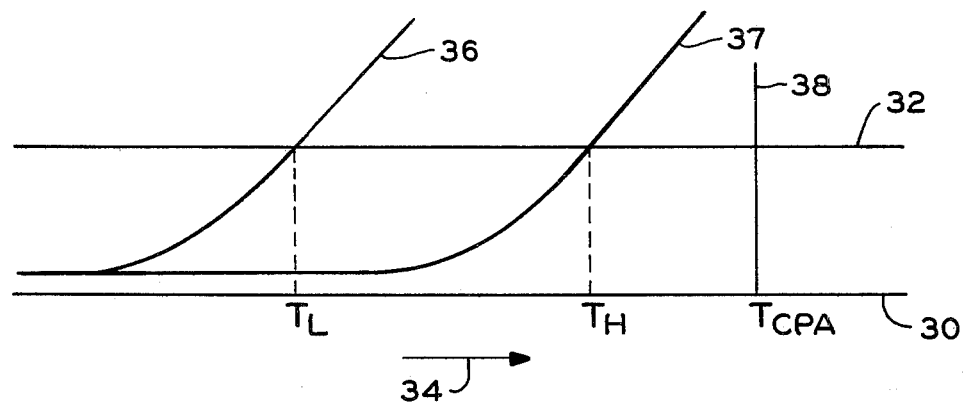
FIGS. 2, 3, and 4 illustrate the result of the use of the preferred embodiment of FIG. 1 to detect three activities of an aircraft.

In the first experiment, the aircraft taxied down a runway strip. FIG. 2 represents the output of the demodulators where the base line 30 represents the quantity of frequency envelope generated. Line 32 indicates a pre-set threshold value. As time progresses, in the direction of arrow 34, the low pass filter envelope shown by line 36 exceeds the minimum threshold time at line 32 at time TL. The high pass envelope shown by line 37 exceeds the threshold 32 at the time shown by TH. Both point of reference, the time of the closest point of approach is indicated by line 38 to be Tcpa. The TH is at least 1 second greater than TL, the device has indicated that the aircraft is taxing.

In the next experiment, the aircraft instituted a take-off procedure on the same runway. In this case, TH as shown by line 37 occurred prior to TL indicating that the low pass envelope occurred after the high pass envelope but prior to CPA, at least with respect to the threshold 32. This confirms that the aircraft was in fact in a take-off activity.

Figure 3:
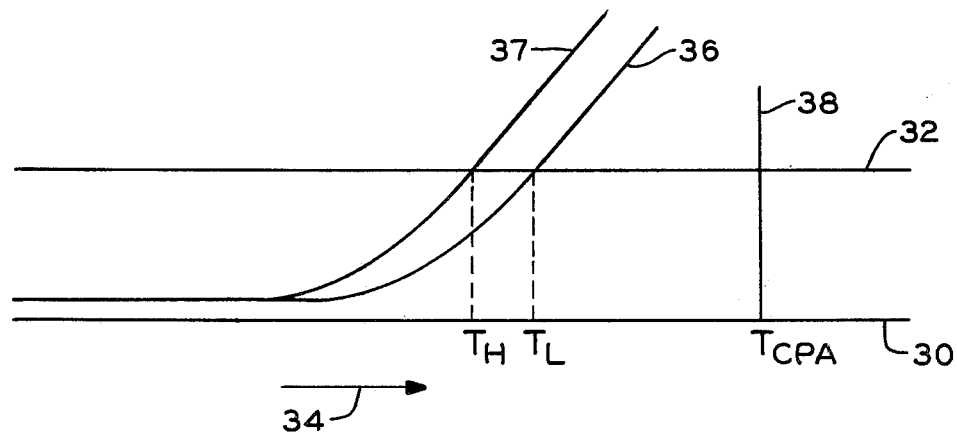
Figure 4:
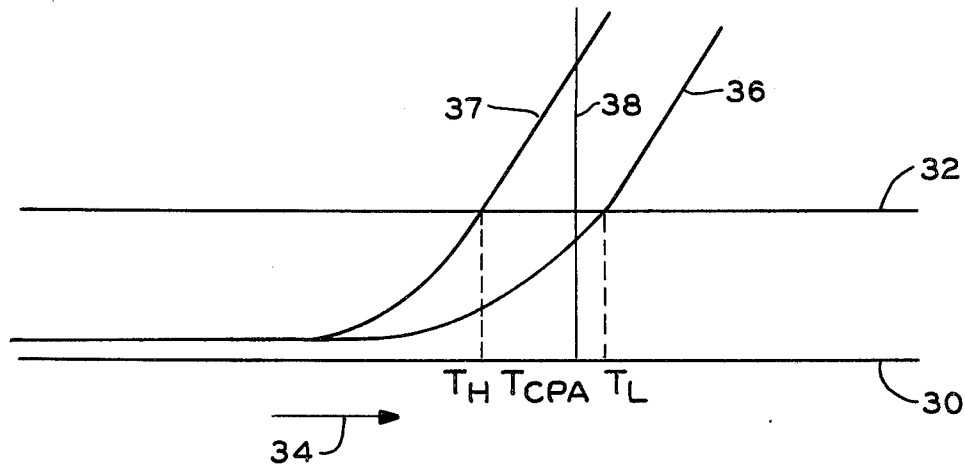

Finally, the aircraft was caused to flyover the same runway at an altitude of less than 100 feet. Again the high band pass envelope time of occurrence indicated by TH occurred prior to the low pass envelope time TL. However, the time of closest point of approach, Tcpa, occurred prior to the time TL of the low pass filter envelope exceeding its threshold 32. This difference from the output shown in FIG. 3 indicates that the aircraft activity was fly-over, rather than take-off.

We claim:

1. Apparatus for classifying the activity of a jet aircraft, comprising:
    a geophone proximate an airfield used by jet aircraft for generating a signal indicative of the existence of a jet aircraft;
    amplifier means for enhancing said signal;
    a low pass filter means for receiving said signal and passing only that portion having a frequency less than about 30 Hz;
    a high band pass filter means for receiving said signal and passing only that portion having a frequency from about 90 to 120 Hz;
    demodulator means for receiving said low pass signal to produce a low pass envelope, and for receiving said high band pass signal to produce a high band pass envelope;
    threshold signal generating means for receiving said low pass envelope and said high band pass envelope, and generating a signal when an envelope reaches a predetermined threshold; and
    comparator means for comparing the time sequence of signals generated by said threshold signal generating means to determine the activity of said jet aircraft.

2. The apparatus of claim 1, which further includes approach timing means for generating a signal at the time the closest point of approach of said jet aircraft occurs, said signal being sent to said comparator means, whereby said comparator means compares the time sequence of said approach timing means and said threshold signal generating means so as to determine the activity of said jet aircraft.

3. The apparatus of claim 1, which further includes indicating means for providing a signal indicating the passing of a taxing jet aircraft, said indicating means being actuated by a signal from said comparator means.

4. The apparatus of claim 3, wherein said comparator means sends said signal to said indicating means when the time of the high band pass envelope exceeds its threshold more than one second after the time the low pass envelope exceeds its threshold.

5. The apparatus of claim 1 which further includes indicating means for providing a signal indicating a take off activity of a jet aircraft, said indicating means being activated by a signal from said comparator means.

6. The apparatus of claim 5, wherein said comparator means sends said signal to said indicating means when the time of said low pass envelope exceeds its threshold one second or less prior to the time the high band pass envelope exceeds its threshold and the high pass envelope exceeds its threshold prior to CPA.

7. The apparatus of claim 2, which further includes indicating means for providing a signal indicating a flyover activity of a jet aircraft, said indicating means being activated by a signal from said comparator means.

8. The apparatus of claim 7, wherein said comparator means sends said signal to said indicating means when the time of said closest point of approach is sooner than the time that said low pass envelope exceeds its threshold.

* * * * *